(No Model.)  4 Sheets—Sheet 1.
E. G. DURANT.
HOLLOW BUILDING BLOCK AND MACHINE FOR MAKING SAME.
No. 576,260.  Patented Feb. 2, 1897.
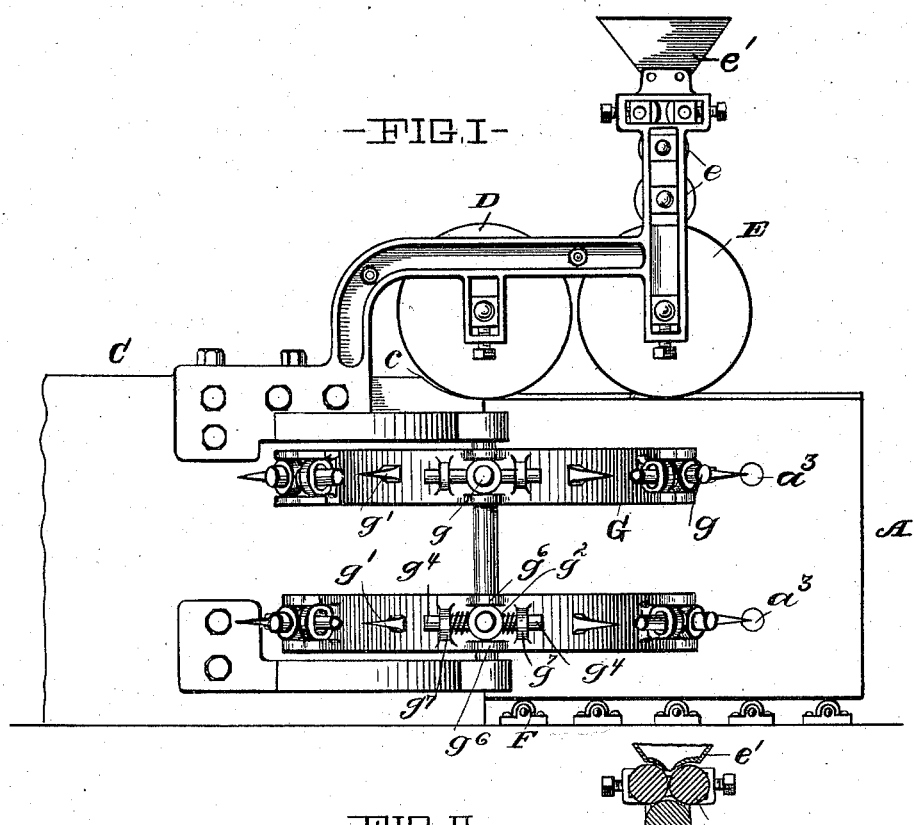
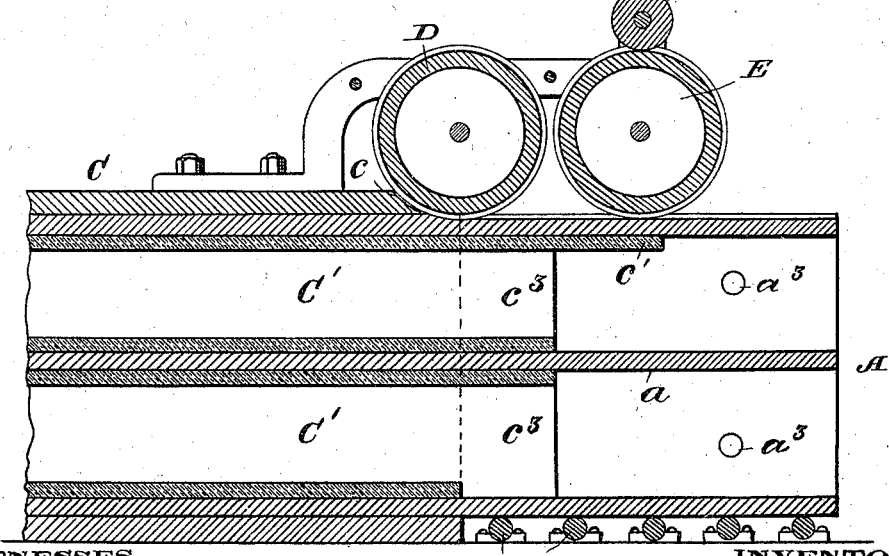
WITNESSES,  INVENTOR, (No Model.) 4 Sheets—Sheet 2.
E. G. DURANT.
HOLLOW BUILDING BLOCK AND MACHINE FOR MAKING SAME.
No. 576,260. Patented Feb. 2, 1897.
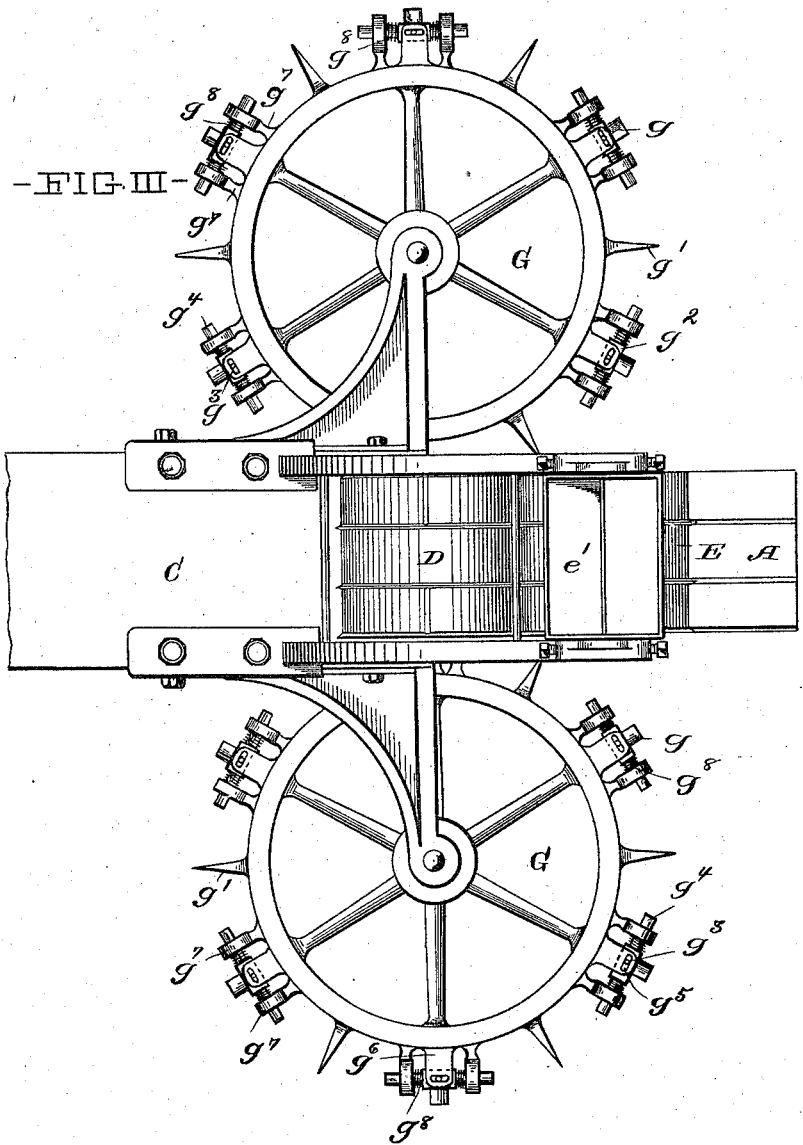
WITNESSES, INVENTOR, (No Model.) 4 Sheets—Sheet 3.
E. G. DURANT.
HOLLOW BUILDING BLOCK AND MACHINE FOR MAKING SAME.
No. 576,260. Patented Feb. 2, 1897.
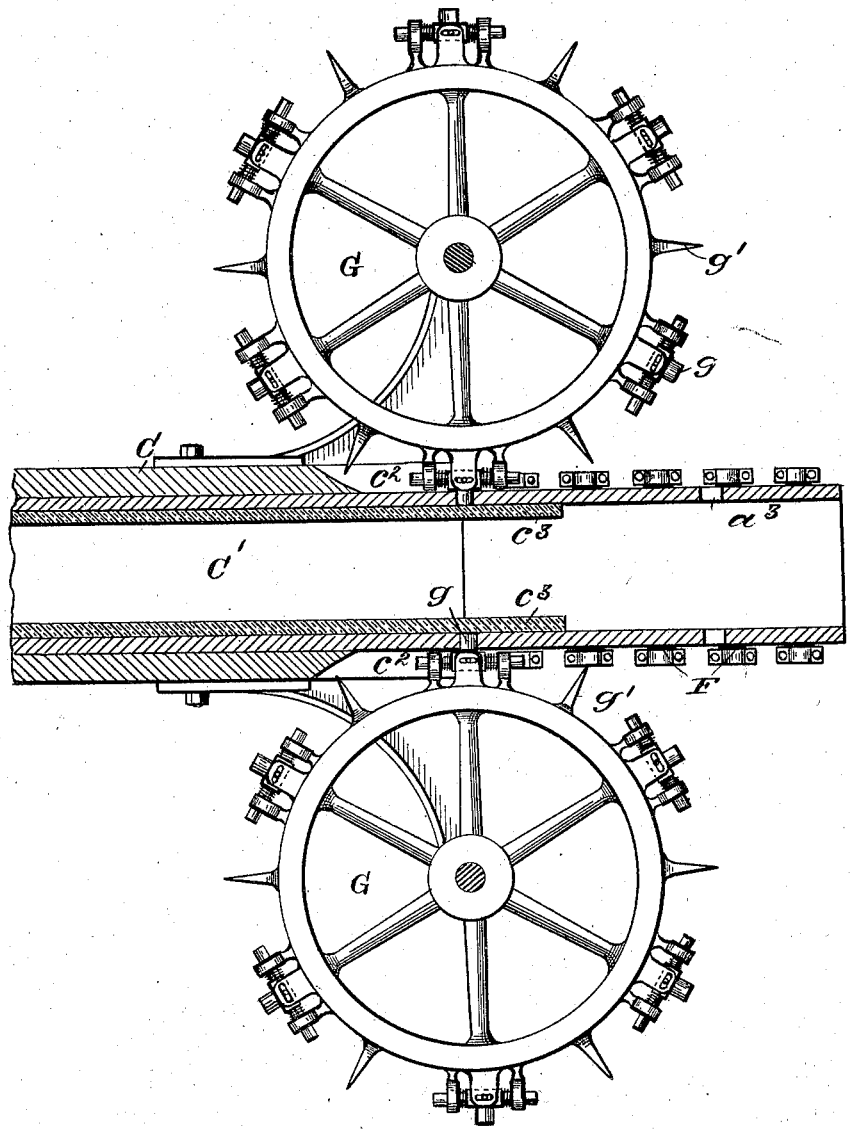
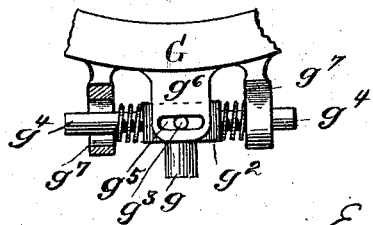
WITNESSES,
J. C. Turner
David P. Davies
INVENTOR,
E. G. Durant
By Hall & Fay
Attys.

(No Model.) 4 Sheets—Sheet 4.
E. G. DURANT.
HOLLOW BUILDING BLOCK AND MACHINE FOR MAKING SAME.
No. 576,260. Patented Feb. 2, 1897.
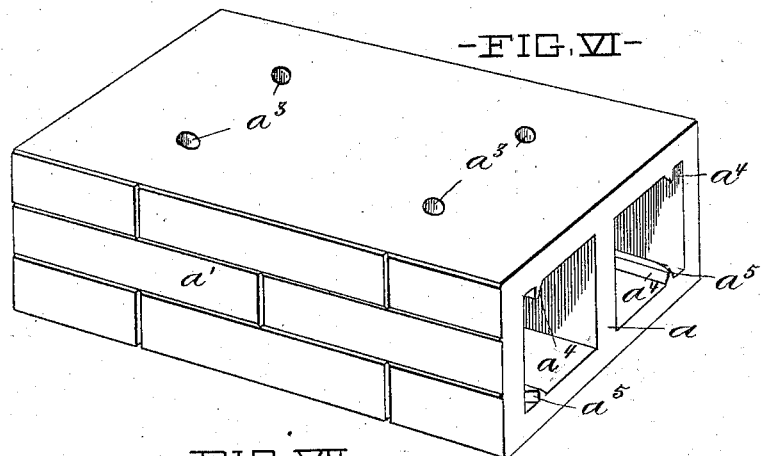
FIG. VI.
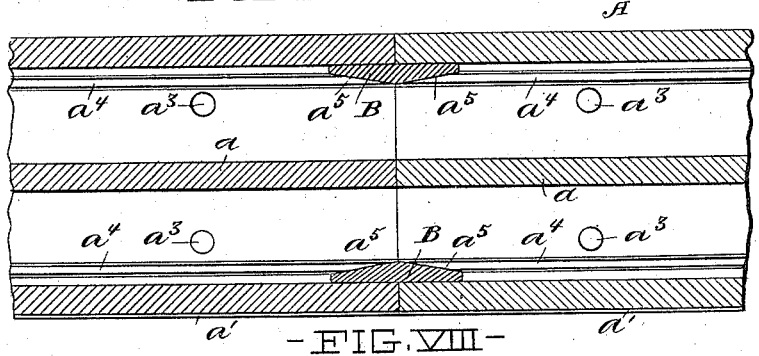
FIG. VII.
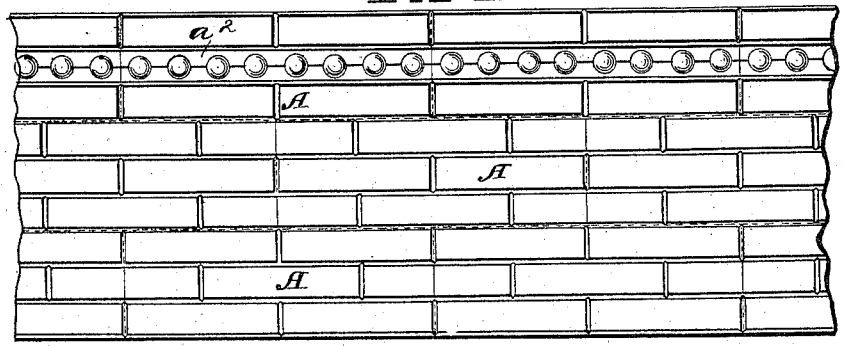
FIG. VIII.
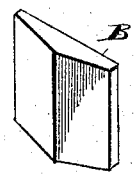
FIG. IX.
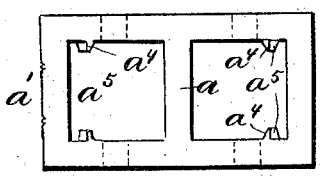
FIG. X.
WITNESSES
J. C. Turner
Wm. Lecher
INVENTOR,
E. G. Durant
By Hall & Fay
Attys.
THE NORRIS PETERS CO., PHOTO-LITHO., WASHINGTON, D. C.

UNITED STATES PATENT OFFICE.

EDWARD G. DURANT, OF PASADENA, CALIFORNIA.

HOLLOW BUILDING-BLOCK AND MACHINE FOR MAKING SAME.

SPECIFICATION forming part of Letters Patent No. 576,260, dated February 2, 1897.

Application filed February 14, 1896. Serial No. 538,318. (No model.)

*To all whom it may concern:*

Be it known that I, EDWARD G. DURANT, a citizen of the United States, and a resident of Pasadena, county of Los Angeles, and State of California, have invented certain new and useful Improvements in Hollow Building-Blocks and Machines for Making the Same, of which the following is a specification, the principle of the invention being herein explained and the best mode in which I have contemplated applying that principle, so as to distinguish it from other inventions.

The annexed drawings and the following description set forth in detail one mechanical form embodying the invention, such detail construction being but one of various mechanical forms in which the principle of the invention may be used.

In the annexed drawings, Figure I represents a side elevation of as much of a machine for making my improved building-blocks as will illustrate my improvement; Fig. II, a longitudinal vertical section thereof; Fig. III, a top plan view of such part of the machine; Fig. IV, a horizontal section of the same; Fig. V, a detail view of one of the punches for making the holes in the block; Fig. VI, a perspective view of the block; Fig. VII, a horizontal section of two blocks, illustrating the joint for the same; Fig. VIII, a view of a portion of a wall built with my improved block; Fig. IX, a perspective view of the joint-strip, and Fig. X an end view of a block.

The hollow building-block A has preferably a longitudinal and vertical partition $a$, and has one vertical face $a'$ suitably decorated with any desired pattern, such as, for instance, an imitation of bricks laid in mortar in proper courses. The joints in the brick-pattern are preferably indented into the surface of the block, so as to imitate tuck-joints or other pointing. The joints of the brick-pattern are, furthermore, preferably colored, so as to imitate penciled joints.

If desired, a belt course of ornaments may be produced in a wall built by my blocks by ornamenting either the entire face or a strip of the same by suitable ornamentations $a^2$ in relief or in intaglio differently colored or in the color of the block. Such a belt course is illustrated at the top of the wall portion illustrated in Fig. VIII. The upper and under sides of the hollow block are formed with perforations $a^3$, which register with each other and are so located that the perforations in the several blocks will register when the latter are laid in courses with the proper breaking of joints. In order that these holes may register when the blocks are laid up in a wall, they will be located at certain definite points.

Where the blocks are to be laid so that those in one layer will break joints with those of the adjoining layer by lapping one-half of their length beyond the point in the adjoining layer, and which is the usual method of laying them, the holes will be made at a point half-way between a transverse central line of the block and the ends of the faces of the block, as shown in Fig. VI. Longitudinal ribs $a^4$ are formed inside of the hollow block upon the upper and under sides of the same near the vertical sides to form a seat for one-half of a joint-strip B, which has its ends beveled in opposite directions, as shown in Fig. IX. This joint-strip may be inserted between the ends of two adjoining blocks at the front, or at both front and rear of the blocks, to bind the two blocks together and to provide surfaces for mortar-joints.

In hollow blocks as heretofore constructed the mortar-joint has been the weakest spot, as the edges of a hollow building-block have been so narrow that a good mortar-joint could not be made. The front or rear joints between two hollow blocks would be liable to be defective and thereby admit air and moisture either entirely or partly through the wall, thus making a leaky wall, which would be liable in time either to crack or, at all events, to disfigure the interior of the wall by moisture having penetrated through the leaky joint. Furthermore, the joints between the narrow edges of hollow building-blocks have been objectionable on account of their lack of strength, which would be particularly objectionable at points where floor-joists would rest upon the joints. The joint-strip serves in the latter case an additional purpose, as a joint having one or two of the joint-strips will be stronger than any other part of the blocks and will be better able to resist the crushing strain of floor-joists than the other parts of the blocks. The wedge shape of the joint-strips, which is the form I prefer, serves to bind the strips in their beveled seats in the ribs and to properly aline the abutting ends of the blocks.

While I have shown both the ribs $a^4$ and the joint-strip B as having their adjoining faces formed inclined or beveled, it is obvious that the inclined or beveled face may be omitted either on the rib or on the joint-strip, as the only object of the inclined faces is to give to the parts when united in a wall a wedging action and thereby force the strip tight against the mortar or cement which is interposed between the flat face of the joint-strip and the wall of the block when the blocks are forced together endwise in the act of laying the wall.

It will readily be seen that if the ribs be made of full width to their extreme ends and the joint-strip be made of the proper thickness they will have the same wedging action when the strip is inserted and the blocks are forced together endwise, and the same result will follow if the joint-strip be made straight on both its faces and the ends of the ribs be beveled or inclined. I prefer, however, to make the joint-strip with wedge-shaped ends, as it is more convenient, whether the ribs have their ends made with inclined or beveled faces or not.

By the employment of my improved building-block a number of advantages are attained. A building having its walls constructed from my blocks may be built at less expense than from solid bricks, as each block occupies the space of about twelve or sixteen bricks, according to the size of block used, and the blocks will thus require less handling in proportion to the cubic volume of wall, as well in transporting them as in laying them. A wall built from my improved blocks will be ornamental in appearance, as it will have the appearance of a brick wall with tuck-joints or similar pointing, while the expense of pointing the joints will be much less than in the case of a solid brick wall, as the joints between the blocks only require pointing, the imitation joints being already finished.

By the use of my improved building-blocks, with the perforations in their upper and under sides registering with each other when laid in a wall, the entire wall will form one hollow chamber. Water, gas, or sewer pipes may be inserted through the registering perforations in the blocks, as well as electric wires, speaking-tubes, or any other means of communication with sources of heat, light, or power, or means for communicating from one room to another or to the outside of the building. Connections may be made to such pipes or wires through the sides of the blocks, and strengthening rods or bolts may be inserted through the registering perforations if additional strength is required for the wall.

The block is made by a machine which embodies the principle of the machine for ornamenting blocks, tiles, &c., for which United States Letters Patent No. 423,915 were granted to me the 25th day of March, 1890.

In the drawings I have simply illustrated the former-die and its attachments, inasmuch as said die may be attached to any suitable pug-mill or similar machine having means for forcibly expelling clay through the die. The former-die C has one or more cores C', which form the cavities in the clay tube from which the bricks are transversely cut, and has four sides, being rectangular in cross-section. The shape of the former-die is, however, dependent upon the shape of the block to be formed by the die. A roller D is journaled at one side of the former-die—in the present case at the top—and the side of the die is cut away, as at $c$, so as to bring that portion of the roller which comes in contact with the clay as the latter is forced through the die to lie within the outer edge of the die, whereby the side of the clay tube against which the roller acts will have support in the die, and distortion of the tube will be prevented. This roller and its arrangement is similar to that disclosed in my above-mentioned patent and operates in the same manner—viz., for the purpose of ornamenting or facing the blocks with any desired pattern in relief or in intaglio. The pattern formed upon the blocks is, in the illustrated case, the brick-pattern shown in Figs. VI and VIII. A roller E is journaled parallel with the ornamenting impression-roller D and a distance from the same, and has suitable distributing-rollers $e$ and a fount $e'$ or other means for distributing coloring material over it. Said color-roller has a pattern upon its periphery similar to the pattern upon the impression-roller and in register with the same, so that the pattern impressed upon the clay tube may be suitably colored with colors which may be burned into the surfaces of the blocks when the latter are burned.

In the case illustrated in the drawings the color-roller has a brick-pattern which colors the joints between the imitation bricks, imitating the penciled joints. That portion $c'$ of the core which registers with the coloring-roller is preferably extended beyond the end of the die to form a support for that wall of the hollow clay tube against which said roller bears. The clay tube is preferably supported from below by the usual rollers F, and the blocks may be transversely severed from the clay tube by any suitable cutting mechanism, such as transversely-movable wires or cutter-disks. As such mechanism is well known in this art and does not form any part of the present invention, I have not deemed it necessary to illustrate the same. For the purpose of forming the perforations in the upper and under sides of the blocks two perforating-wheels G are arranged at each of two opposite sides of the former-die. Said wheels have a number of equidistant cutters $g$, which form the perforations, and may have radiating points $g'$ between the cutters for the purpose of insuring the regular rotation of the wheels with the clay tube as the latter passes out through the die. The points and cutters are engaged by the clay tube and carry the wheels around, so that the perforating-wheels will revolve in exact unison with the clay tube and the cutters will form the perforations at the exact points desired. As the cutters would strike and leave the sides of the clay tube obliquely if they were rigidly secured to radiate from the peripheries of the perforating-wheels, and would thus form the perforations in the sides of the clay tube with flaring outer ends, said cutters are arranged to have rocking motion and longitudinal motion in the plane of the wheel, so that each cutter may strike and leave the side of the clay tube at a right angle to the same and may cut an even perforation in the side of the tube. Each cutter consists of a short metal tube and is secured in a socket $g^2$, having two opposite laterally-projecting trunnions $g^3$ and two oppositely-projecting arms $g^4$ at right angles to the trunnions. The trunnions may slide and rock in longitudinal slots $g^5$ in a pair of ears $g^6$, projecting from the periphery of the wheel, and the arms may rock and slide in slotted lugs $g^7$, one at each arm, the slots in said lugs being in the plane of the wheel. As it is important that the clay tube is supported while being acted upon by the cutters, the sides of the former-die are cut away at the end of the latter, as at $c^2$, into which recesses the wheels project, and the sides of the cores are extended, as at $c^3$, to support the sides of the clay tube from within at the points where the cutters act upon the tube. Springs $g^8$ are provided upon the projecting arms $g^4$ for the purpose of insuring the proper position of the cutters where they enter the side of the clay tube.

I am aware that solid brick or building-blocks have been patented with perforations so arranged that when laid in the wall a series of continuous holes would be formed at intervals from top to bottom, but having no connection with air-chambers in the interior of the blocks, as in mine, and that hollow blocks have been patented with holes in their sides to enable the mortar to adhere when the wall was plastered, thereby closing said holes; also, that hollow building-blocks have been patented showing right-angled grooves in their abutting ends for the reception of a right-angled dowel-piece to be inserted without mortar or any adhesive material, and that a patent has been granted for flooring-tiles having dovetailed grooves formed in their backs for the insertion of dovetailed strips, either oblong or circular, to prevent their becoming displaced and uneven.

I am also aware that it is common to emboss leather, paper, and other textile fabrics, and that a patent has been granted for a sheet-metal covering for walls stamped or embossed to imitate stone or brick, and also that a patent has been granted for a hollow tile having its two side walls inclined toward each other, thus giving the tile a wedge shape, with a hole in said inclined walls midway of its length, but which is incapable of being laid with lap-joints and have said holes register, as in mine, and therefore I hereby disclaim all of said devices; but What I do claim as my invention is—

1. An open-ended hollow building-block of rectangular form provided with perforations in its upper and lower faces or walls forming vertical passages through the block, said perforations being located midway between a transverse central line and the ends of the upper and lower faces of said block, substantially as shown and described.

2. An open-ended hollow building-block of rectangular form, provided with ribs on the inner faces of its top and bottom walls to form seats for joint-strips to be inserted endwise within said block when laid in a wall, substantially as shown and described.

3. A joint-strip having its ends beveled or inclined in opposite direction from the center, in combination with the hollow open-ended building-block provided with internal ribs, substantially as and for the purpose set forth.

4. In a machine for forming hollow building-blocks, the combination of a former-die having a core constructed to form a clay tube, and a perforating-wheel journaled to project into a recess in the side of the die-shell, said wheel having cutters supported on its periphery adapted to have longitudinal and rocking movements in the plane of the wheel, substantially as shown and described.

5. In a machine for forming hollow building-blocks, a perforating-wheel having pairs of ears upon its periphery parallel with the plane of the wheel, and provided with longitudinal slots, said wheel having lugs adjacent to the ears formed with slots in the plane of the wheel, a tubular cutter and a socket for said cutter formed with trunnions adapted to both rock and slide in the slots of said ears, and having laterally-projecting arms engaging in the slotted lugs, and springs arranged to hold said cutter normally midway between said ears and allow it to yield or move with the clay as the same is forced from the die, substantially as shown and described.

6. In a machine for forming hollow building-blocks, the combination with a tubular forming-die, an embossing-roller at the discharge end of said die, and a roller having a pattern on its face corresponding with that of the embossing-roller, arranged to apply coloring-matter to the embossed face of the block as the latter is forced from the die, substantially as shown and described.

In testimony that I claim the foregoing to be my invention I have hereunto set my hand this 14th day of January, A. D. 1895.

EDWARD G. DURANT.

Witnesses:
J. C. LUND,
J. PITCHER.